US008296457B2

(12) United States Patent
Archer et al.

(10) Patent No.: US 8,296,457 B2
(45) Date of Patent: *Oct. 23, 2012

(54) PROVIDING NEAREST NEIGHBOR POINT-TO-POINT COMMUNICATIONS AMONG COMPUTE NODES OF AN OPERATIONAL GROUP IN A GLOBAL COMBINING NETWORK OF A PARALLEL COMPUTER

(75) Inventors: Charles J. Archer, Rochester, MN (US); Ahmad A. Faraj, Rochester, MN (US); Todd A. Inglett, Rochester, MN (US); Joseph D. Ratterman, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 673 days.

This patent is subject to a terminal disclaimer.

(21) Appl. No.: 11/832,955

(22) Filed: Aug. 2, 2007

(65) Prior Publication Data

US 2009/0037598 A1 Feb. 5, 2009

(51) Int. Cl.
*G06F 15/173* (2006.01)
*G06F 15/16* (2006.01)
*G06F 15/00* (2006.01)
*G06Q 10/00* (2006.01)

(52) U.S. Cl. .................. 709/238; 709/250; 705/1; 712/3
(58) Field of Classification Search .................... 709/238
See application file for complete search history.

(56) References Cited

U.S. PATENT DOCUMENTS

| | | | |
|---|---|---|---|
| 5,265,207 A * | 11/1993 | Zak et al. ........................ 712/15 |
| 5,333,268 A * | 7/1994 | Douglas et al. ............... 709/244 |
| 5,530,809 A * | 6/1996 | Douglas et al. ............... 709/250 |
| 5,666,361 A * | 9/1997 | Aznar et al. .................. 370/392 |
| 6,622,233 B1 * | 9/2003 | Gilson ............................ 712/11 |
| 7,000,033 B2 | 2/2006 | Lee |
| 7,007,189 B2 | 2/2006 | Lee et al. |
| 7,051,185 B2 * | 5/2006 | Gilson ............................ 712/11 |
| 7,099,341 B2 | 8/2006 | Lingafelt et al. |
| 7,483,998 B2 | 1/2009 | Rabinovitch |
| 7,673,011 B2 | 3/2010 | Archer et al. |
| 7,773,618 B2 | 8/2010 | Leonard et al. |

(Continued)

OTHER PUBLICATIONS

IEFT.org, "RFC 3031: Multiprotocol Label Switching Architecture," Jan. 2001.*

(Continued)

*Primary Examiner* — Haresh N Patel
*Assistant Examiner* — Evans Desrosiers
(74) *Attorney, Agent, or Firm* — Biggers & Chanian, LLP

(57) ABSTRACT

Methods, apparatus, and products are disclosed for providing nearest neighbor point-to-point communications among compute nodes of an operational group in a global combining network of a parallel computer, each compute node connected to each adjacent compute node in the global combining network through a link, that include: identifying each link in the global combining network for each compute node of the operational group; designating one of a plurality of point-to-point class routing identifiers for each link such that no compute node in the operational group is connected to two adjacent compute nodes in the operational group with links designated for the same class routing identifiers; and configuring each compute node of the operational group for point-to-point communications with each adjacent compute node in the global combining network through the link between that compute node and that adjacent compute node using that link's designated class routing identifier.

15 Claims, 9 Drawing Sheets

U.S. PATENT DOCUMENTS

| | | | |
|---|---|---|---|
| 2002/0049608 A1* | 4/2002 | Hartsell et al. | 705/1 |
| 2003/0126289 A1* | 7/2003 | Aggarwal et al. | 709/242 |
| 2004/0078493 A1* | 4/2004 | Blumrich et al. | 709/250 |
| 2006/0101158 A1* | 5/2006 | Shand et al. | 709/239 |
| 2008/0084827 A1 | 4/2008 | Archer et al. | |
| 2008/0301704 A1 | 12/2008 | Archer et al. | |
| 2009/0037598 A1 | 2/2009 | Archer et al. | |
| 2009/0043912 A1 | 2/2009 | Archer et al. | |
| 2009/0043988 A1 | 2/2009 | Archer et al. | |
| 2009/0138892 A1 | 5/2009 | Almasi et al. | |
| 2010/0014523 A1 | 1/2010 | Archer et al. | |
| 2010/0017420 A1 | 1/2010 | Archer et al. | |

OTHER PUBLICATIONS

Sedgewick, Robert, "Algorithms in C++ Part 5: Graph Algorithms, Third Edition," Addison-Wesley Professional, Dec. 2001.*
IEFT.org, "RFC 3031: Multiprotocol Label Switching Architecture," Jan. 2001, p. 1-61.*
U.S. Patent Application entitled, "Providing Full Point-to-Point Communications Among Compute Nodes of an Operational Group in a Global Combining Network of a Parallel Computer,", filed Aug. 6, 2007, U.S. Appl. No. 11/834,159.
Office Action, U.S. Appl. No. 12/176,840, Jul. 21, 2008.
Office Action Dated Jun. 10, 2009 in U.S. Appl. No. 11/834,159.
Office Action Dated Jun. 23, 2009 in U.S. Appl. No. 11/832,955.
Moreira, et al.; "the Blue Gene/L Supercomputer: A Hardware and Software Story"; Intl. Journal of Parallel Programming; vol. 35, No. 3; Jun. 2007; pp. 181-206.
Faraj, et al.; "A Message Scheduling Scheme for All-to-All Personalized Communication on Etherney Switched Clusters", IEEE Trans on Parallel and Distributed Systems, Vo. 18; No. 2; Feb. 2007, p. 264-276.
Office Action Dated Apr. 23, 2010 in U.S. Appl. No. 12/176,840.
Office Action, U.S. Appl. No. 12/176,840, Sep. 30, 2010.
Final Office Action, U.S. Appl. No. 11/834,159, Dec. 9, 2009.
Final Office Action U.S. Appl. No. 11/832,955, Dec. 21, 2009.
Office Action, U.S. Appl. No. 12/176,840, Aug. 30, 2011.
Office Action, U.S. Appl. No. 11/834,159, Dec. 13, 2011.
Final Office Action, U.S. Appl. No. 11/834,159, Mar. 29, 2012.

* cited by examiner

PROVIDING NEAREST NEIGHBOR POINT-TO-POINT COMMUNICATIONS AMONG COMPUTE NODES OF AN OPERATIONAL GROUP IN A GLOBAL COMBINING NETWORK OF A PARALLEL COMPUTER

STATEMENT REGARDING FEDERALLY SPONSORED RESEARCH OR DEVELOPMENT

This invention was made with Government support under Contract No. B54331 awarded by the Department of Energy. The Government has certain rights in this invention.

BACKGROUND OF THE INVENTION

1. Field of the Invention

The field of the invention is data processing, or, more specifically, methods, apparatus, and products for providing nearest neighbor point-to-point communications among compute nodes of an operational group in a global combining network of a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network generally supports point-to-point communications. A tree network, however, typically only supports communications where data from one compute node migrates through tiers of the tree network to a root compute node or where data is multicast from the root to all of the other compute nodes in the tree network. In such a manner, the tree network lends itself to collective operations such as, for example, reduction operations or broadcast operations. In the current art, however, the tree network does not lend itself to and is typically inefficient for point-to-point operations. As such, readers will appreciate any improvements in providing nearest neighbor point-to-point communications among compute nodes of an operational group in a global combining network of a parallel computer.

SUMMARY OF THE INVENTION

Methods, apparatus, and products are disclosed for providing nearest neighbor point-to-point communications among compute nodes of an operational group in a global combining network of a parallel computer, each compute node connected to each adjacent compute node in the global combining network through a link, that include: identifying each link in the global combining network for each compute node of the operational group; designating one of a plurality of point-to-point class routing identifiers for each link such that no compute node in the operational group is connected to two adjacent compute nodes in the operational group with links designated for the same class routing identifiers; and configuring each compute node of the operational group for pointto-point communications with each adjacent compute node in the global combining network through the link between that compute node and that adjacent compute node using that link's designated class routing identifier.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
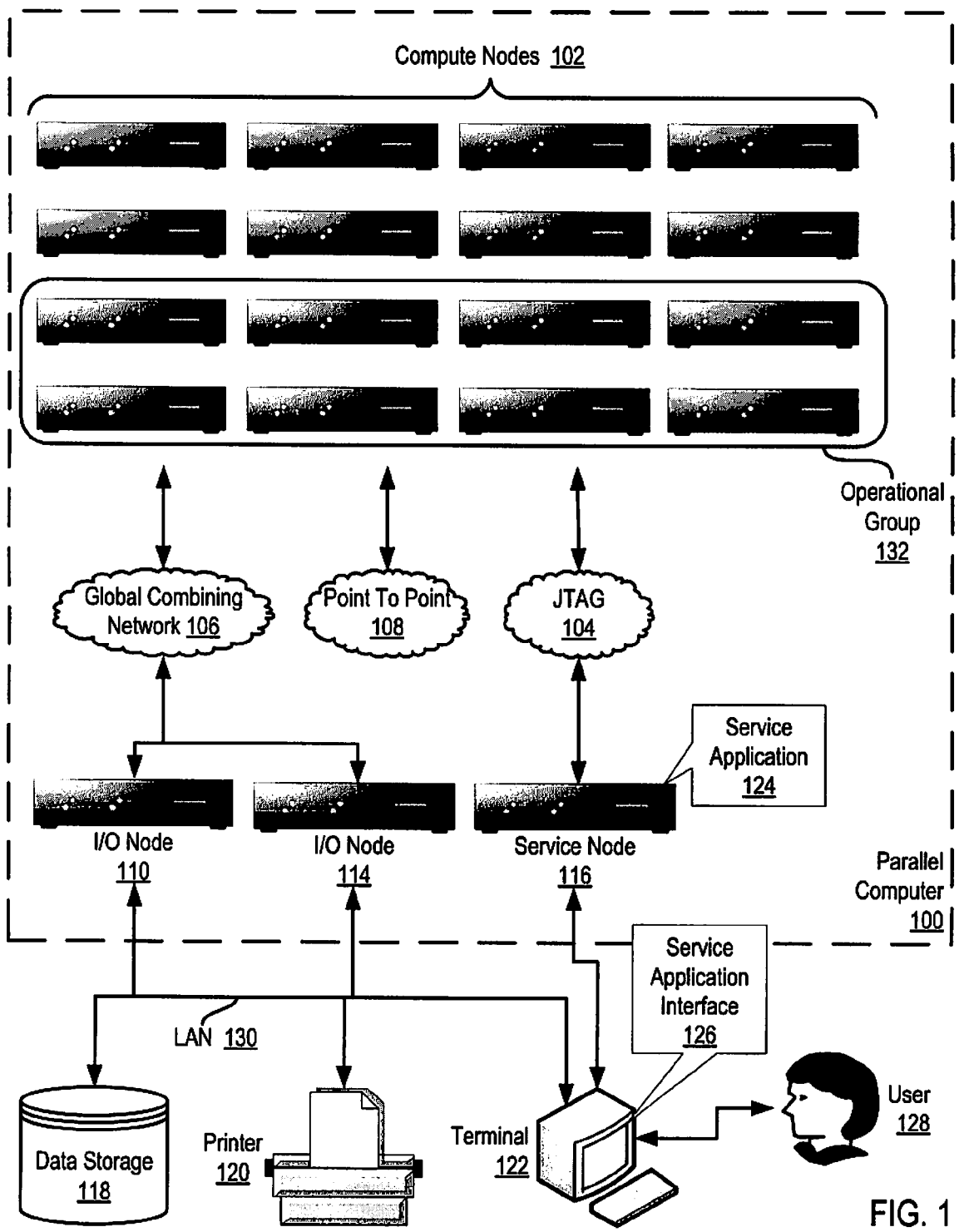
FIG. 1 illustrates an exemplary parallel computer for providing nearest neighbor point-to-point communications among compute nodes of an operational group in a global combining network according to embodiments of the present invention.

Exemplary methods, apparatus, and computer program products for providing nearest neighbor point-to-point communications among compute nodes of an operational group in a global combining network of a parallel computer according to embodiments of the present invention are described with reference to the accompanying drawings, beginning with FIG. 1. FIG. 1 illustrates an exemplary parallel computer for providing nearest neighbor point-to-point communications among compute nodes of an operational group in a global combining network according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The I/O nodes (110, 114) provide I/O services between compute nodes (102) and I/O devices (118, 120, 122). I/O nodes (110, 114) are connected for data communications I/O devices (118, 120, 122) through local area network ('LAN') (130) implemented using high-speed Ethernet. The parallel computer (100) also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the service application (124) on the service node (116) in FIG. 1 includes computer program instructions for providing nearest neighbor point-to-point communications among the compute nodes of the operational group (132) in a global combining network (106) of the parallel computer (100). Nearest neighbor point-to-point communications are communications between a compute node and one of its adjacent compute nodes in a global combining network that occur without the involvement of any other compute nodes in the global combining network. Each compute node connected to each adjacent compute node in the global combining network through a link. The service application (124) on the service node (116) in FIG. 1 may operate generally for providing nearest neighbor point-to-point communications among the compute nodes of the operational group (132) in a global combining network (106) according to embodiments of the present invention by: identifying each link in the global combining network (106) for each compute node of the operational group (132); designating one of a plurality of point-to-point class routing identifiers for each link such that no compute node in the operational group is connected to two adjacent compute nodes in the operational group (132) with links designated for the same class routing identifiers; and configuring each compute node of the operational group for point-to-point communications with each adjacent compute node in the global combining network through the link between that compute node and that adjacent compute node using that link's designated class routing identifier.

The arrangement of nodes, networks, and I/O devices making up the exemplary system illustrated in FIG. 1 are for explanation only, not for limitation of the present invention. Data processing systems capable of providing nearest neighbor point-to-point communications among compute nodes of an operational group in a global combining network of a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of determining when a set of compute nodes participating in a barrier operation are ready to exit the barrier operation according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Providing nearest neighbor point-to-point communications among compute nodes of an operational group in a global combining network according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of providing nearest neighbor point-to-point communications among compute nodes of an operational group in a global combining network according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library. Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
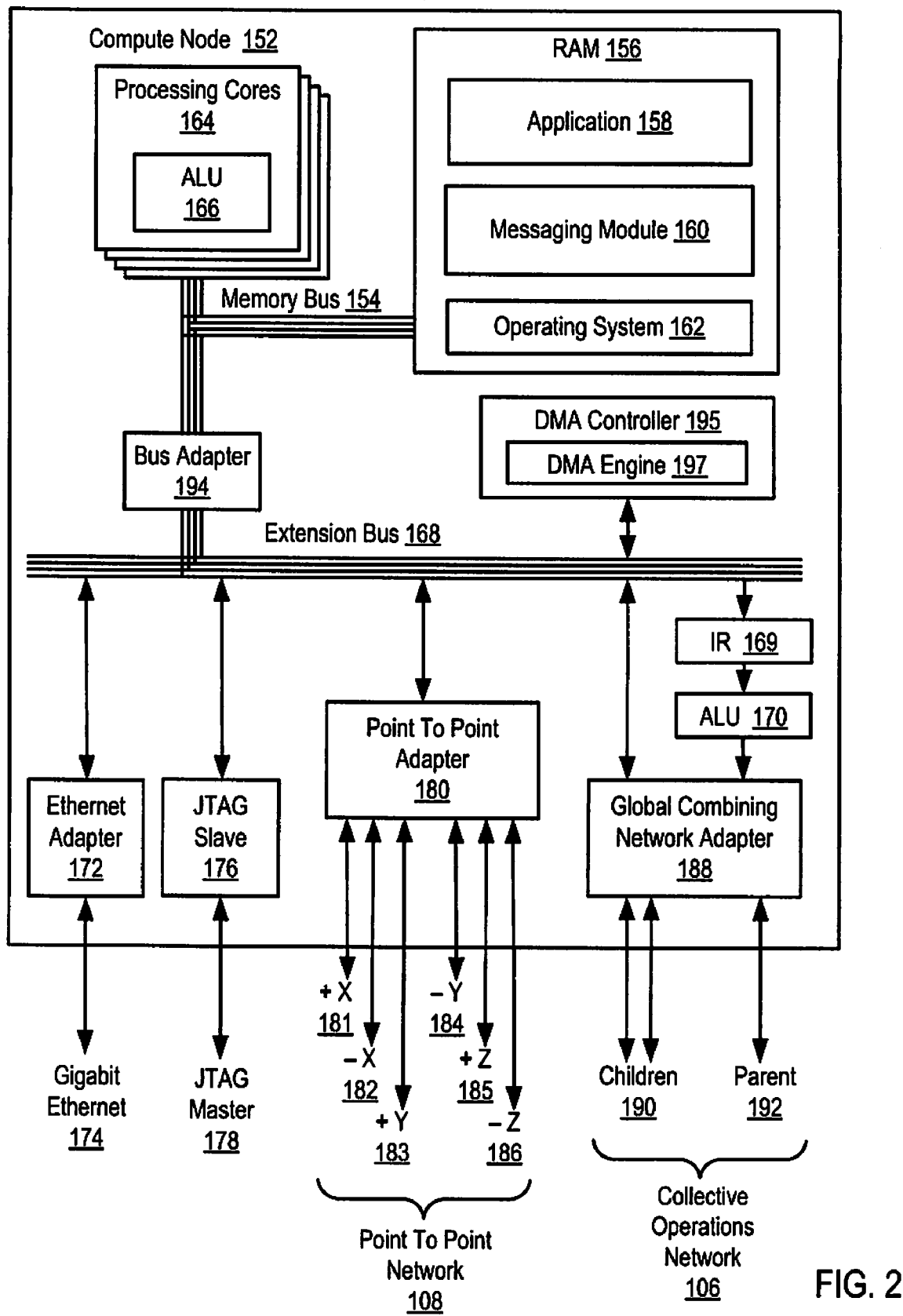
FIG. 2 sets forth a block diagram of an exemplary compute node useful in a parallel computer capable of providing nearest neighbor point-to-point communications among compute nodes of an operational group in a global combining network according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for providing nearest neighbor point-to-point communications among compute nodes of an operational group in a global combining network of a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in providing nearest neighbor point-to-point communications among compute nodes of an operational group in a global combining network of a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. In the example of FIG. 2, the DMA engine (197) is configured in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

As mentioned above, the compute node (152) of FIG. 2 is useful in a parallel computer capable of providing nearest neighbor point-to-point communications among compute nodes of an operational group in a global combining network according to embodiments of the present invention. In such a parallel computer according to embodiments of the present invention, each compute node is connected to each adjacent compute node in the global combining network through a link such as, for example, the bidirectional links to parent node (192) and child nodes (190).

The parallel computer operates generally for providing nearest neighbor point-to-point communications among compute nodes of an operational group in a global combining network according to embodiments of the present invention by: identifying each link in the global combining network for each compute node of the operational group; designating one of a plurality of point-to-point class routing identifiers for each link such that no compute node in the operational group is connected to two adjacent compute nodes in the operational group with links designated for the same class routing identifiers; and configuring each compute node of the operational group for point-to-point communications with each adjacent compute node in the global combining network through the link between that compute node and that adjacent compute node using that link's designated class routing identifier.

Figure 3A:
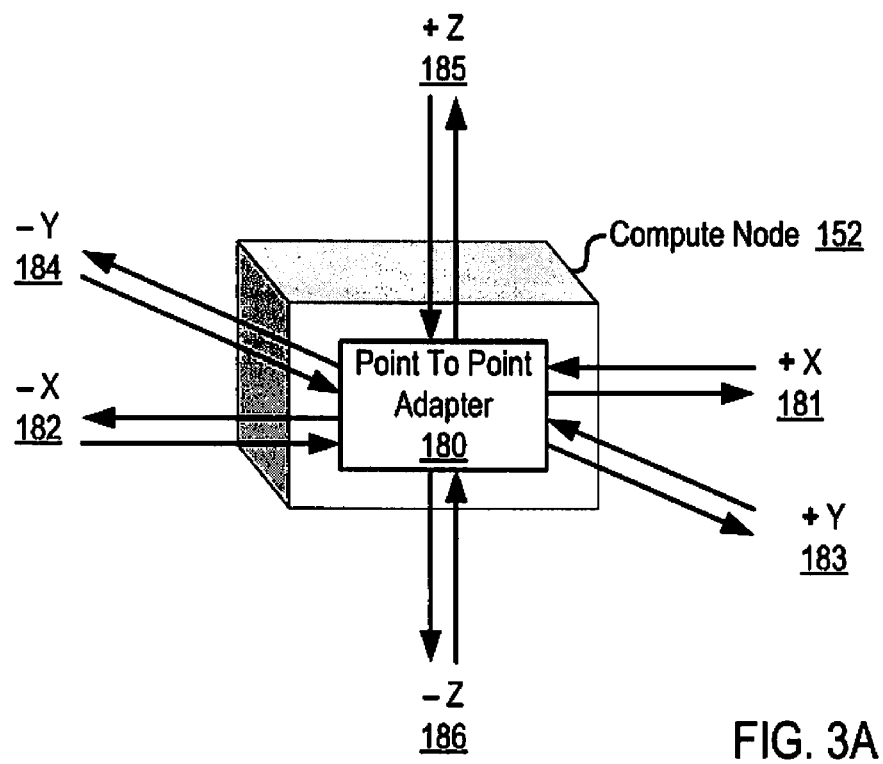
FIG. 3A illustrates an exemplary Point To Point Adapter useful in a parallel computer capable of providing nearest neighbor point-to-point communications among compute nodes of an operational group in a global combining network according to embodiments of the present invention.

For further explanation, FIG. 3A illustrates an exemplary Point To Point Adapter (180) useful in a parallel computer capable of providing nearest neighbor point-to-point communications among compute nodes of an operational group in a global combining network according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
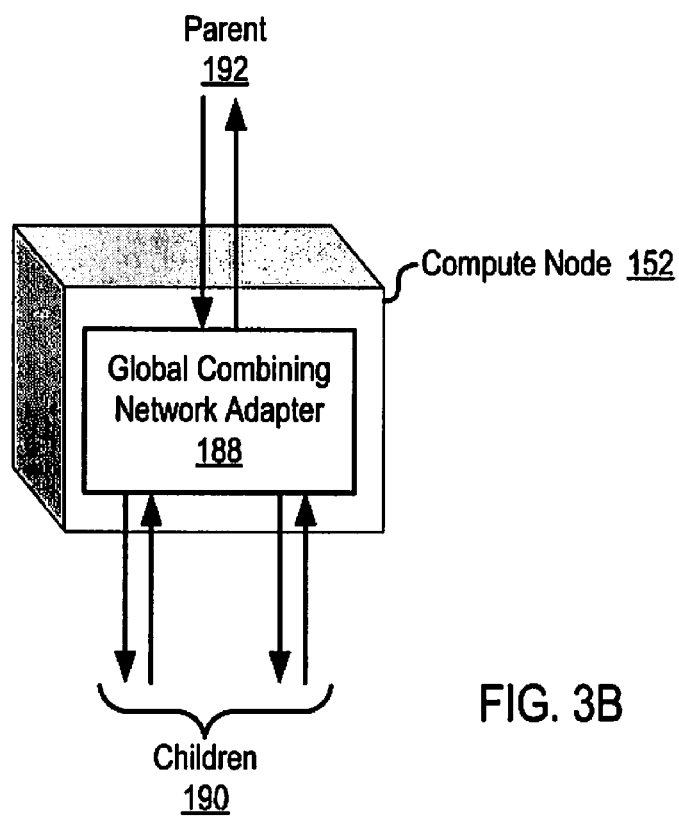
FIG. 3B illustrates an exemplary Global Combining Network Adapter useful in a parallel computer capable of providing nearest neighbor point-to-point communications among compute nodes of an operational group in a global combining network according to embodiments of the present invention.

For further explanation, FIG. 3B illustrates an exemplary Global Combining Network Adapter (188) useful in a parallel computer capable of providing nearest neighbor point-to-point communications among compute nodes of an operational group in a global combining network according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes (190) through two links. Each link to each child node (190) is formed from two unidirectional data communications paths. Global Combining Network Adapter (188) also provides data communication to and from a parent node (192) through a link form from two unidirectional data communications paths.

Figure 4:
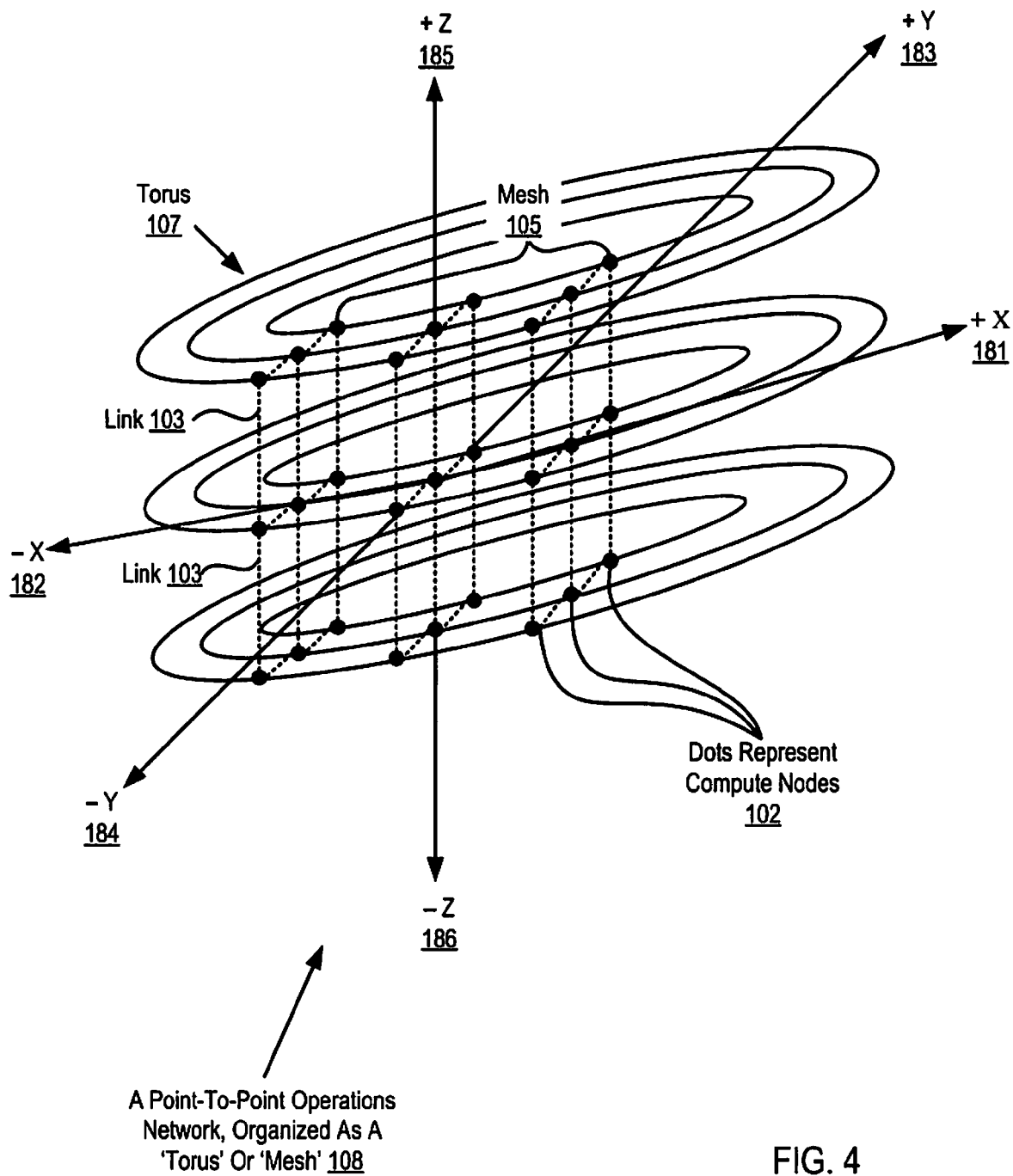
FIG. 4 sets forth a line drawing illustrating an exemplary data communications network optimized for point to point operations useful in a parallel computer capable of providing nearest neighbor point-to-point communications among compute nodes of an operational group in a global combining network according to embodiments of the present invention.

For further explanation, FIG. 4 sets forth a line drawing illustrating an exemplary data communications network (108) optimized for point to point operations useful in a parallel computer capable of providing nearest neighbor point-to-point communications among compute nodes of an operational group in a global combining network in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and from in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in providing nearest neighbor point-to-point communications among compute nodes of an operational group in a global combining network of a parallel computer in accordance with embodiments of the present invention may contain only a few compute nodes or may contain thousands of compute nodes.

Figure 5:
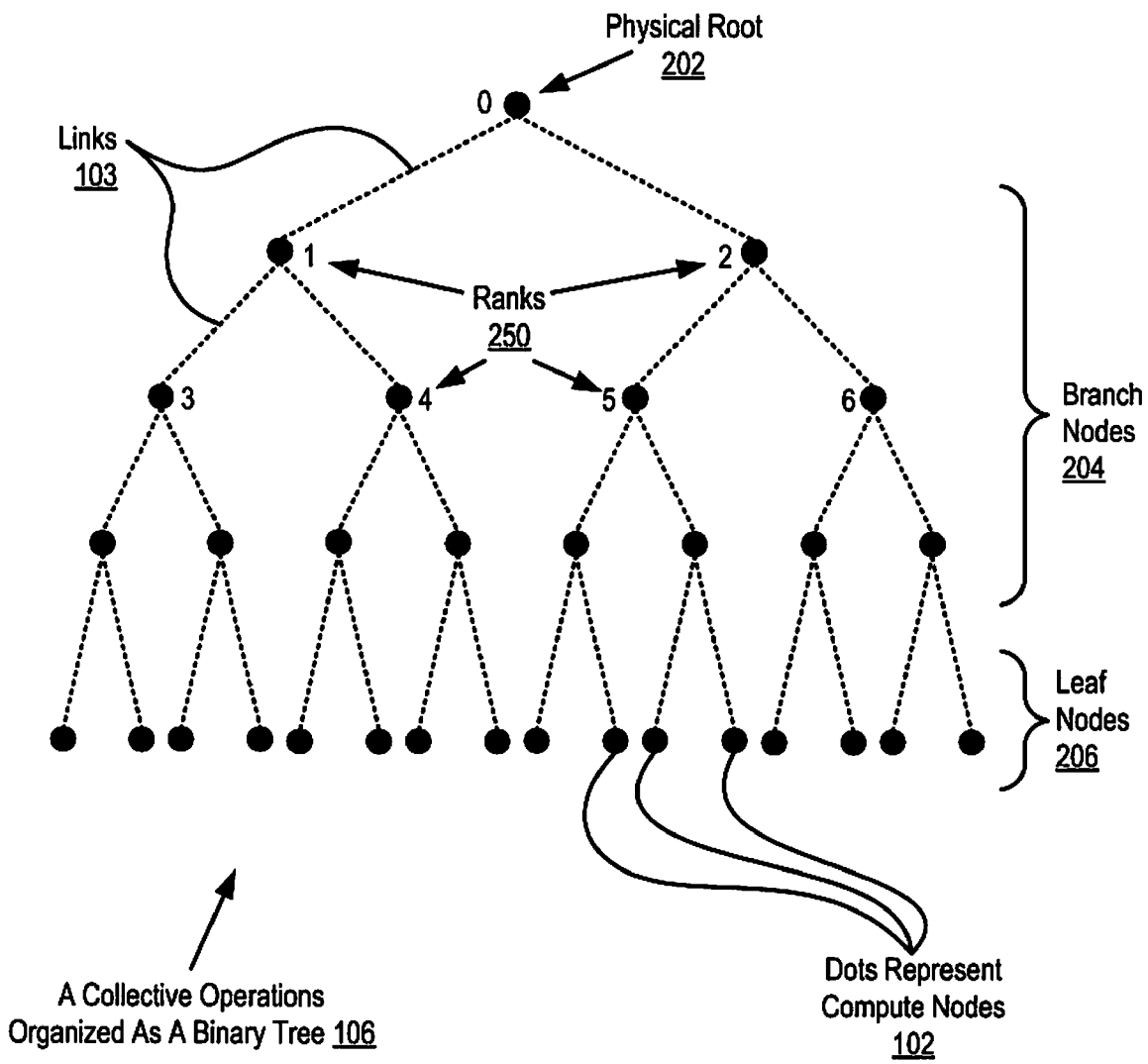
FIG. 5 sets forth a line drawing illustrating an exemplary data communications network optimized for collective operations useful in a parallel computer capable of providing nearest neighbor point-to-point communications among compute nodes of an operational group in a global combining network according to embodiments of the present invention.

For further explanation, FIG. 5 sets forth a line drawing illustrating an exemplary data communications network (106) optimized for collective operations useful in a parallel computer capable of providing nearest neighbor point-to-point communications among compute nodes of an operational group in a global combining network in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in a parallel computer for providing nearest neighbor point-to-point communications among compute nodes of an operational group in a global combining network accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6A:
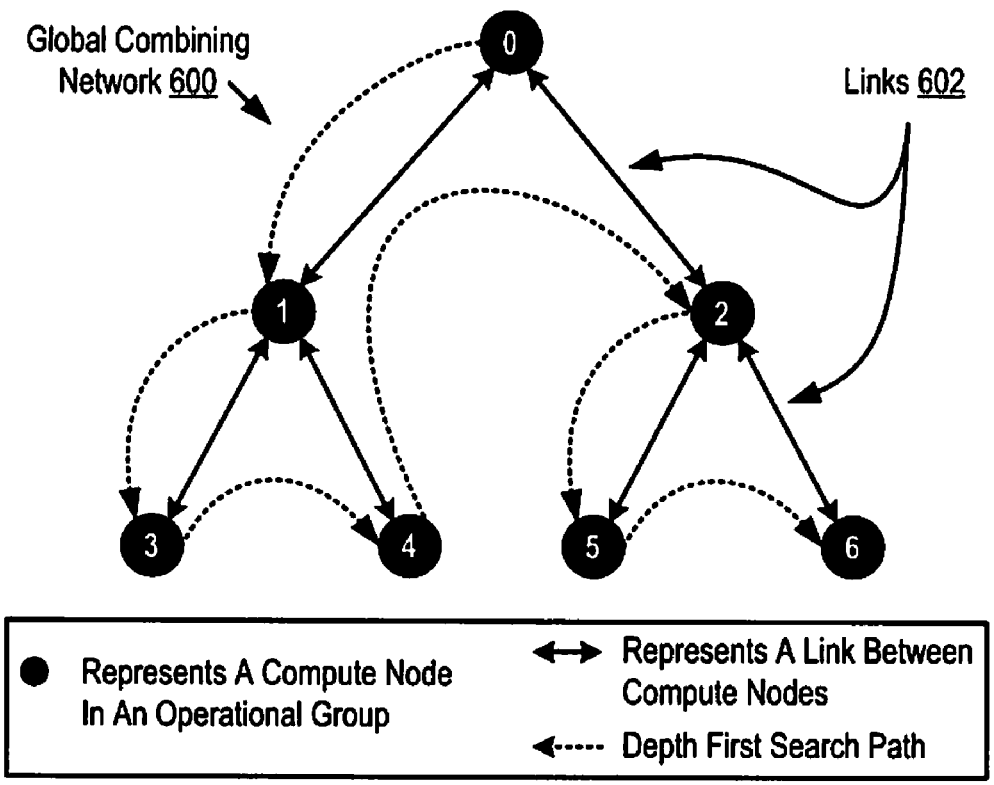
FIG. 6A sets forth a line drawing illustrating exemplary links between compute nodes in a parallel computer capable of providing nearest neighbor point-to-point communications among compute nodes of an operational group in a global combining network according to embodiments of the present invention.

For further explanation, FIG. 6A sets forth a line drawing illustrating exemplary links (602) between compute nodes in a parallel computer capable of providing nearest neighbor point-to-point communications among compute nodes of an operational group in a global combining network according to embodiments of the present invention. The global combining network (600) in the example of FIG. 6A connects the compute nodes '0,' '1,' '2,' '3,' '4,' '5,' and '6' together for data communications. Each child node in the tree network (600) is connected to its parent node through a link (602) that provides bi-directional data communications. In the example of FIG. 6A, each link (602) is composed of two data communications paths that each provides communications in one direction, either from the parent node to the child node or from the child node to the parent node.

In the example of FIG. 6A, to provide nearest neighbor point-to-point communications among the compute nodes in the global combining network (600) according to embodiments of the present invention, the parallel computer identifies each link in the global combining network for each compute node in the global combining network (600). The parallel computer identifies each link in the global combining network for each compute node in the global combining network (600) of FIG. 6A by traversing the compute nodes of the operational group in the global combining network (600) using a depth first search. A depth first search is an algorithm for traversing a tree structure that explores as far as possible along a branch of the tree until a node with no children is identified and then backtracks, returning to the most recently traversed node having another unexplored branch. Consider, for example, the global combining network (600) in the example of FIG. 6A in which the parallel computer performs a depth first search through the global combining network (600) starting with the compute node '0.' In such an example, the parallel computer traverses from compute node '0' to compute node '1' and then to compute node '3.' Upon reaching compute node '3,' the parallel computer backtracks to compute node '1' and traverses to compute node '4.' Upon reaching compute node '4,' the parallel computer backtracks to compute node '0' and traverses to compute node '2.' The parallel computer then traverses to compute node '5.' Upon reaching compute node '5,' the parallel computer backtracks to compute node '2' and traverses to compute node '6.'

As the parallel computer performs the depth first search, the parallel computer identifies the links (602) between the traversed compute nodes. In the example of FIG. 6A, the parallel computer identifies six links between the compute nodes in the global combining network (600): the link between compute node '0' and compute node '1,' the link between compute node '1' and compute node '3,' the link between compute node '1' and compute node '4,' the link between compute node '0' and compute node '2,' the link between compute node '2' and compute node '5,' and the link between compute node '2' and compute node '6.'

After identifying each link in the global combining network for each compute node of the operational group, a parallel computer typically provides nearest neighbor point-to-point communications among compute nodes of an operational group in a global combining network according to embodiments of the present invention by designating one of a plurality of point-to-point class routing identifiers for each link such that no compute node in the operational group is connected to two adjacent compute nodes in the operational group with links designated for the same class routing identifiers. For further explanation, FIG. 6B sets forth a line drawing illustrating exemplary class routing identifiers useful in a parallel computer capable of providing nearest neighbor point-to-point communications among compute nodes of an operational group in a global combining network according to embodiments of the present invention.

Figure 6B:
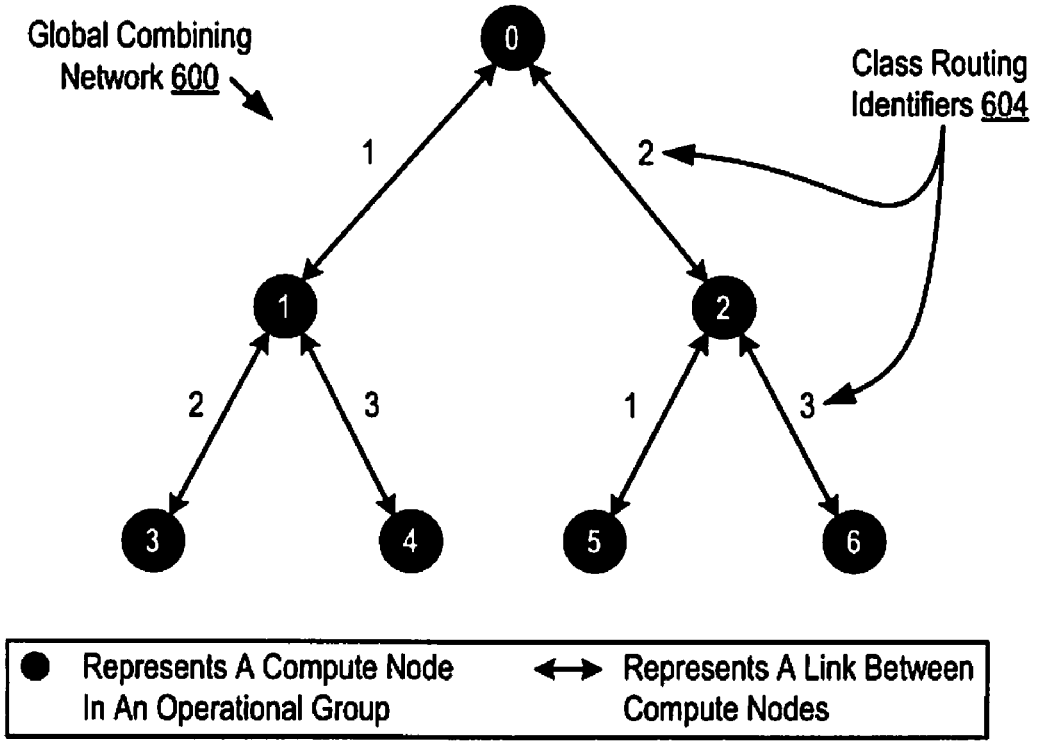
FIG. 6B sets forth a line drawing illustrating exemplary class routing identifiers useful in a parallel computer capable of providing nearest neighbor point-to-point communications among compute nodes of an operational group in a global combining network according to embodiments of the present invention.

The global combining network (600) in the example of FIG. 6B is similar to the global combining network in the example of FIG. 6A. The global combining network (600) of FIG. 6B connects the compute nodes '0,' '1,' '2,' '3,' '4,' '5,' and '6' together for data communications. Each child node in the tree network (600) is connected to its parent node through a link that provides bi-directional data communications.

In the example of FIG. 6B, the parallel computer designates one of a plurality of point-to-point class routing identifiers for each link such that no compute node in the operational group is connected to two adjacent compute nodes in the operational group with links designated for the same class routing identifiers. A class routing identifier is an identifier that specifies a set of class routing instructions for use by a compute node in routing a particular network packet in the global combining network. A point-to-point class routing identifier specifies a set of class routing instructions used to implement point-to-point data communications in the global combining network. Using different class routing identifiers, a compute node may route network packets using different sets of routing instructions. In the example of FIG. 6B, the plurality of point-to-point class routing identifiers includes '1,' '2,' and '3.' Each class routing identifier is used by a compute node to specify the routing instructions for routing a packet to an adjacent compute node in the global combining network (600) along the link for which the class routing identifier is designated.

In the example of FIG. 6B, the parallel computer may designate one of a plurality of point-to-point class routing identifiers for each link by identifying a particular class routing identifier for the link among the point-to-point class routing identifiers '1,' '2,' and '3,' determining whether the particular class routing identifier has already been designated for another link for the compute node, and if the identified class routing identifier has not already been designated for another link for the compute node, designating the identified class routing identifier for the link. In such a manner, the link between compute node '0' and compute node '1' may be designated with the class routing identifier '1.' The link between compute node '1' and compute node '3' may be designated with the class routing identifier '2.' The link between compute node '1' and compute node '4' may be designated with the class routing identifier '3.' The link between compute node '0' and compute node '2' may be designated with the class routing identifier '2.' The link between compute node '2' and compute node '5' may be designated with the class routing identifier '1.' The link between compute node '2' and compute node '6' may be designated with the class routing identifier '3.'

FIG. 6A illustrates an exemplary manner in which a parallel computer may identify each link in the global combining network for each compute node of the operational group. FIG. 6B illustrates an exemplary manner in which a parallel computer may designate one of a plurality of point-to-point class routing identifiers for each link such that no compute node in the operational group is connected to two adjacent compute nodes in the operational group with links designated for the same class routing identifiers. Turning now to illustrate an exemplary manner in which a parallel computer may configure each compute node of the operational group for point-to-point communications with each adjacent compute node in the global combining network through the link between that compute node and that adjacent compute node using that link's designated class routing identifier, consider FIG. 7A that sets forth a line drawing illustrating exemplary routing instructions useful in a parallel computer capable of providing nearest neighbor point-to-point communications among compute nodes of an operational group in a global combining network according to embodiments of the present invention.

Figure 7A:
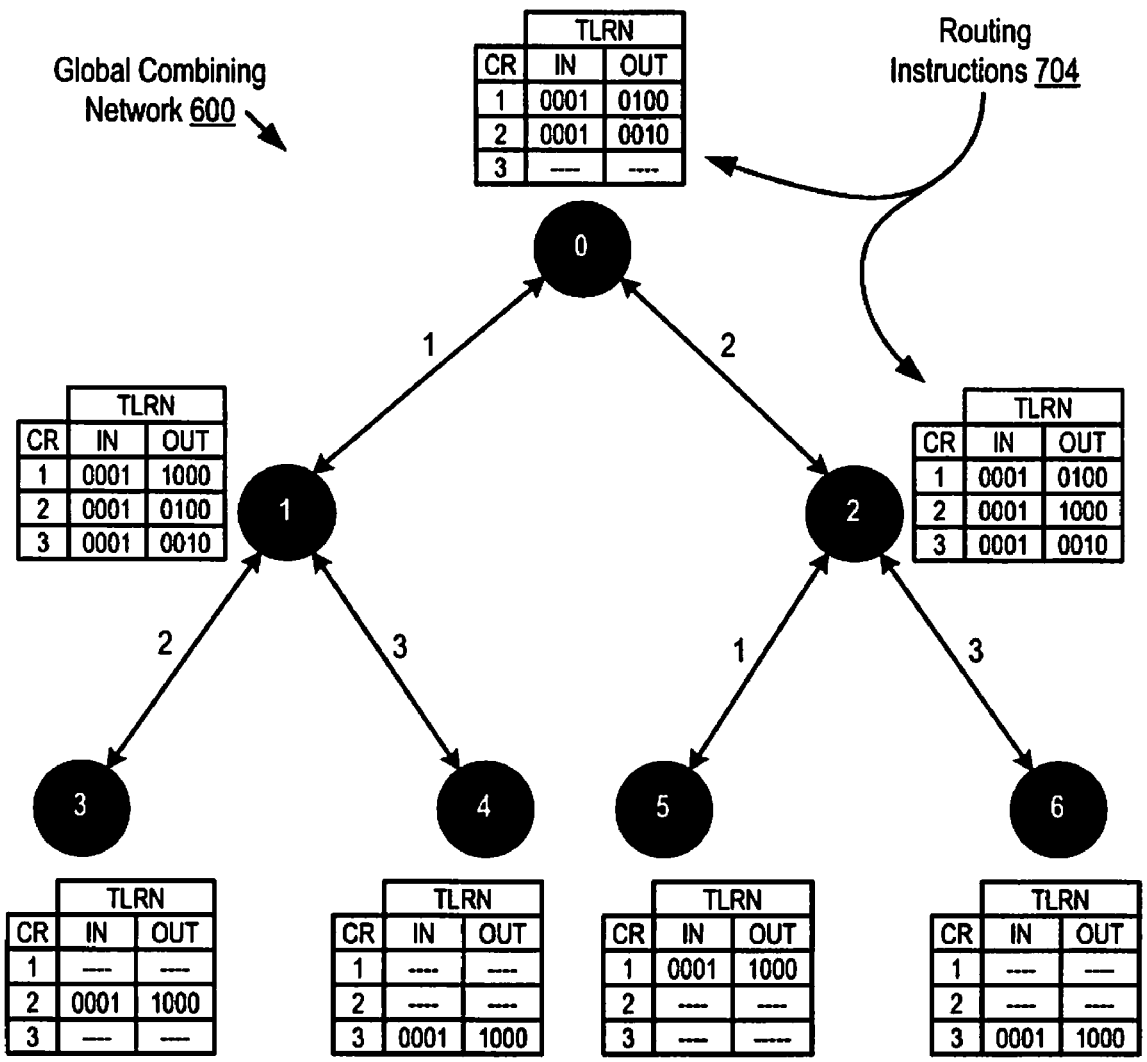
FIG. 7A sets forth a line drawing illustrating exemplary routing instructions useful in a parallel computer capable of providing nearest neighbor point-to-point communications among compute nodes of an operational group in a global combining network according to embodiments of the present invention.

FIG. 7A illustrates an exemplary global combining network (600) that includes compute nodes '0,' '1,' '2,' '3,' '4,' '5,' and '6' of an operational group. Each compute node is connected with each of its respective adjacent compute nodes in the global combining network (600) using a bi-directional link. Each link between the compute nodes in the exemplary global combining network (600) of FIG. 7A is designated with a class routing identifier '1,' '2,' or '3.' The parallel computer configures each compute node of the operational group for point-to-point communications with each adjacent compute node in the global combining network through the link between that compute node and that adjacent compute node using that link's designated class routing identifier. Each compute node of the operational group may be configured for point-to-point communications with each adjacent compute node in the example of FIG. 7A by configuring routing registers for that compute node with routing instructions (704) that associate each class routing identifier with the corresponding link between that compute node and each adjacent compute node. Routing instructions specify the manner in which a compute node routes packets for a particular class routing identifier. Using different routing instructions for different class routing identifiers, a compute node may route different packets according to different routing instructions. For example, for one class routing identifier, a compute node of the network (600) may route packets specifying that class routing identifier to a particular adjacent compute node. For another class routing identifier, the compute node of the network (600) may route packets specifying that class routing identifier to another adjacent compute node. In such a manner, two different routing configurations may exist among the same compute nodes on the same physical network.

Figure 7B:
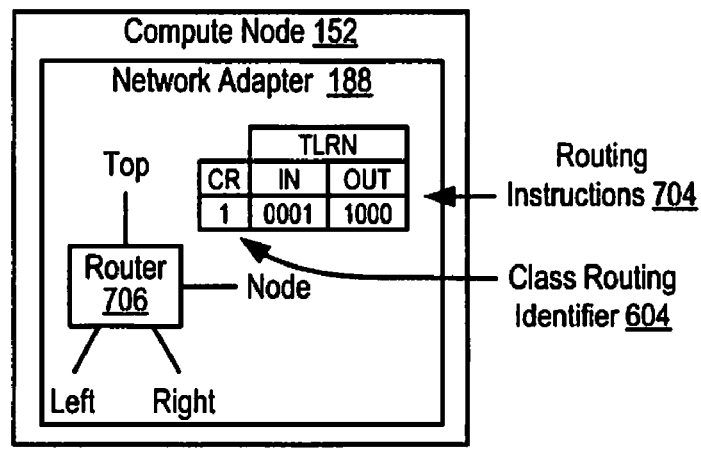
FIG. 7B sets forth a block diagram illustrating a further exemplary compute node useful in a parallel computer capable of providing nearest neighbor point-to-point communications among compute nodes of an operational group in a global combining network according to embodiments of the present invention.

To aid readers in understanding how routing instructions are configured in routing registers of each compute node to provide point-to-point communications with each adjacent compute node in the global combining network through the link between that compute node and that adjacent compute node using that link's designated class routing identifier, consider FIG. 7B that sets forth a block diagram illustrating a further exemplary compute node useful in a parallel computer capable of providing nearest neighbor point-to-point communications among compute nodes of an operational group in a global combining network according to embodiments of the present invention. The compute node (152) of FIG. 7B includes a global combining network adapter (188) as described above. The network adapter (188) has a link labeled 'Top' that links the compute node (152) to its parent in a global combining network. The network adapter (188) has a link labeled 'Left' that links the compute node (152) to its child node along the left branch in the global combining tree. The network adapter (188) has a link labeled 'Right' that links the compute node (152) to its child node along the right branch in the global combining tree. The network adapter (188) also has a link labeled 'Node' that links the router to the other components (not shown) of the compute node (152) such as for example, a DMA controller, an expansion bus, a processing core, volatile memory, and so on. Through the 'Node' link, the other components of the compute node (152) receive and inject packets onto the global combining network.

The global combining network adapter (188) includes two routing registers (704) for each class routing identifier (604), one register labeled 'IN' and the other register labeled 'OUT.' Each register is four bits in size such that each bit in each register corresponds to one of the links labeled 'Top,' 'Left,' 'Right,' or 'Node.' In the example of FIG. 7B, the first bit of each register (704) corresponds to the link labeled 'Top.' The second bit of each register (704) corresponds to the link labeled 'Left.' The third bit of each register (704) corresponds to the link labeled 'Right.' The fourth bit of each register (704) corresponds to the link labeled 'Node.'

The network adapter (188) of FIG. 7B includes a router (706) that receives packets to be routed on a global combining network that connects the compute node (152) to other compute nodes. When the router (706) of FIG. 7B receives a packet on a link, the router (706) applies a routing algorithm to determine the links along which the router (706) should forward the packet. The routing algorithm used by the router (706) in the example of FIG. 7B utilizes the routing instructions stored in the routing registers (704) of the network adapter (188). The routing algorithm operates generally as follows:

the router (706) identifies the link on which the router (706) received a packet for routing, the router (706) looks up the value for the bit in the 'IN' register that corresponds to the link on which the router received the packet, if the bit value is zero, then the packet is forwarded on the links which correspond to the bits in the 'IN' register for which the bit value is one, and if the bit value is one, then the packet is forwarded on the links which correspond to the bits in the 'OUT' register for which the bit value is one.

Using the routing algorithm described above, the exemplary routing instructions configured in the routing register (704) of FIG. 7B specify forwarding a packet along the link labeled 'Node' if the packet is received on any of the links labeled 'Top,' 'Left,' or 'Right.' If the packet is received on the link labeled 'Node,' the exemplary routing instructions configured in the routing register (704) of FIG. 7B specify forwarding the packet along the link labeled 'Top' to the parent node. Readers will note that the exemplary routing instructions (704) and exemplary class routing identifier (604) in FIG. 7B are for explanation only and not for limitation. Other routing instructions, class routing identifiers, and implementations thereof may be useful in providing nearest neighbor point-to-point communications among compute nodes of an operational group in a global combining network of a parallel computer according to embodiments of the present invention.

Turning back to FIG. 7A, each compute node in the global combining network (600) may execute a point-to-point communication to an adjacent compute node of the operational group by identifying a particular class routing identifier for the link between the compute node and the adjacent compute node, and sending, to the adjacent compute node, a network packet in dependence upon the particular class routing identifier and the routing instructions for the compute node. The manner in which the routing instructions and the class routing identifiers are used to effect such nearest neighbor point-to-point communications is described below using the routing instructions illustrated in FIG. 7A and the routing algorithm described above with referenced to FIG. 7B.

Consider a point-to-point communication from compute node '0' to compute node '1' in the example of FIG. 7A: Compute node '0' identifies the class routing identifier '1' for the link between compute node '0' and adjacent compute node '1.' Compute node '0' may then encode the class routing identifier '1' in the network packet for transmission to compute node '1' and inject the packet into compute node '0's router. The router for compute node '0' identifies the routing instructions associated with class routing identifier '1' in compute node ' O's routing registers. Because the router for compute node '0' receives the packet on the 'Node' link, the routing instructions for compute node '0' specify forwarding the packet on the 'Left' link to compute node '1.' The router for compute node '1' in turn receives the packet on the 'Top' link from compute node '0.' The routing instructions associated with class routing identifier '1' specify forwarding the packet on the 'Node' link to compute node '1.' A point-to-point communication in the opposite direction from compute node '1' to compute node '0' operates in a similar manner as described above.

In the example of FIG. 7A, consider a point-to-point communication from compute node '1' to compute node '3': Compute node '1' identifies the class routing identifier '2' for the link between compute node '1' and adjacent compute node '3.' Compute node '1' may then encode the class routing identifier '2' in the network packet for transmission to compute node '3' and inject the packet into compute node '1's router. The router for compute node '1' identifies the routing instructions associated with class routing identifier '2' in compute node '1's routing registers. Because the router for compute node '1' receives the packet on the 'Node' link, the routing instructions for compute node '1' specify forwarding the packet on the 'Left' link to compute node '3.' The router for compute node '3' in turn receives the packet on the 'Top' link from compute node '1.' The routing instructions associated with class routing identifier '2' specify forwarding the packet on the 'Node' link to compute node '3.' A point-to-point communication in the opposite direction from compute node '3' to compute node '1' operates in a similar manner as described above.

Consider now a point-to-point communication from compute node '1' to compute node '4' in the example of FIG. 7A: Compute node '1' identifies the class routing identifier '3' for the link between compute node '1' and adjacent compute node '4.' Compute node '1' may then encode the class routing identifier '3' in the network packet for transmission to compute node '4' and inject the packet into compute node '1's router. The router for compute node '1' identifies the routing instructions associated with class routing identifier '3' in compute node '1's routing registers. Because the router for compute node '1' receives the packet on the 'Node' link, the routing instructions for compute node '1' specify forwarding the packet on the 'Right' link to compute node '4.' The router for compute node '4' in turn receives the packet on the 'Top' link from compute node '1.' The routing instructions associated with class routing identifier '3' specify forwarding the packet on the 'Node' link to compute node '4.' A point-to-point communication in the opposite direction from compute node '4' to compute node '1' operates in a similar manner as described above.

In the example of FIG. 7A, consider a point-to-point communication from compute node '0' to compute node '2': Compute node '0' identifies the class routing identifier '2' for the link between compute node '0' and adjacent compute node '2.'Compute node '0' may then encode the class routing identifier '2' in the network packet for transmission to compute node '2' and inject the packet into compute node '0's router. The router for compute node '0' identifies the routing instructions associated with class routing identifier '2' in compute node '0's routing registers. Because the router for compute node '0' receives the packet on the 'Node' link, the routing instructions for compute node '0' specify forwarding the packet on the 'Right' link to compute node '2.' The router for compute node '2' in turn receives the packet on the 'Top' link from compute node '0.' The routing instructions associated with class routing identifier '2' specify forwarding the packet on the 'Node' link to compute node '2.' A point-to-point communication in the opposite direction from compute node '2' to compute node '0' operates in a similar manner as described above.

Consider now a point-to-point communication from compute node '2' to compute node '5' in the example of FIG. 7A: Compute node '2' identifies the class routing identifier '1' for the link between compute node '2' and adjacent compute node '5.' Compute node '2' may then encode the class routing identifier '1' in the network packet for transmission to compute node '5' and inject the packet into compute node '2's router. The router for compute node '2' identifies the routing instructions associated with class routing identifier '1' in compute node '2's routing registers. Because the router for compute node '2' receives the packet on the 'Node' link, the routing instructions for compute node '2' specify forwarding the packet on the 'Right' link to compute node '5.' The router for compute node '5' in turn receives the packet on the 'Top' link from compute node '2.' The routing instructions associated with class routing identifier '1' specify forwarding the packet on the 'Node' link to compute node '5.' A point-to-point communication in the opposite direction from compute node '5' to compute node '2' operates in a similar manner as described above.

In the example of FIG. 7A, consider now a point-to-point communication from compute node '2' to compute node '6': Compute node '2' identifies the class routing identifier '3' for the link between compute node '2' and adjacent compute node '6.' Compute node '2' may then encode the class routing identifier '3' in the network packet for transmission to compute node '6' and inject the packet into compute node '2's router. The router for compute node '2' identifies the routing instructions associated with class routing identifier '3' in compute node '2's routing registers. Because the router for compute node '2' receives the packet on the 'Node' link, the routing instructions for compute node '2' specify forwarding the packet on the 'Left' link to compute node '6.' The router for compute node '6' in turn receives the packet on the 'Top' link from compute node '2.' The routing instructions associated with class routing identifier '3' specify forwarding the packet on the 'Node' link to compute node '6.' A point-to-point communication in the opposite direction from compute node '6' to compute node '2' operates in a similar manner as described above.

Figure 8:
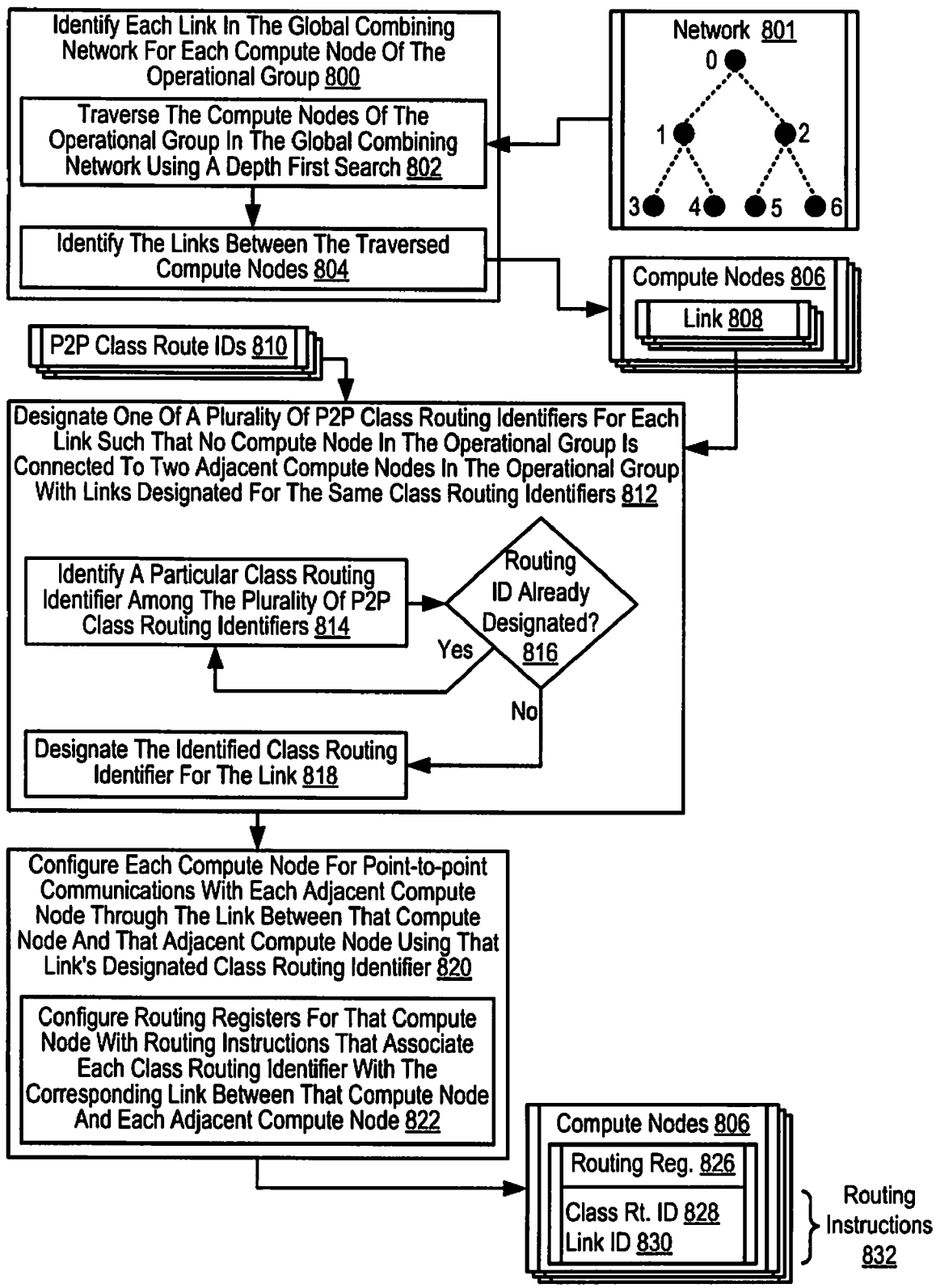
FIG. 8 sets forth a flow chart illustrating an exemplary method for providing nearest neighbor point-to-point communications among compute nodes of an operational group in a global combining network of a parallel computer according to the present invention.

For further explanation, FIG. 8 sets forth a flow chart illustrating an exemplary method for providing nearest neighbor point-to-point communications among compute nodes of an operational group in a global combining network of a parallel computer according to the present invention. The parallel computer includes a plurality of compute nodes organized into at least one operational group for collective parallel operations. The compute nodes in the operational group are connected for data communications using a global combining network (801). In the example of FIG. 8, the global combining network (801) connects seven compute nodes having ranks 0, 1, 2, 3, 4, 5, and 6 for data communications. Each compute node is connected to each adjacent compute node in the global combining network (801) through a link. Each compute node in the operational group is assigned a unique rank.

The method of FIG. 8 includes identifying (800) each link (808) in the global combining network (801) for each compute node (806) of the operational group. Identifying (800) each link (808) in the global combining network (801) for each compute node (806) of the operational group according to the method of FIG. 8 may be carried out by a service node of the parallel computer. Identifying (800) each link (808) in the global combining network (801) for each compute node (806) of the operational group according to the method of FIG. 8 includes traversing the compute nodes of the operational group in the global combining network (801) using a depth first search and identifying the links (808) between the traversed compute nodes (806). A depth first search is an algorithm for traversing a tree structure, such as a global combining network, that explores as far as possible along a branch of the tree until a node with no children is identified and then backtracks, returning to the most recently traversed node having another unexplored branch.

Traversing the compute nodes of the operational group in the global combining network (801) using a depth first search and identifying the links (808) between the traversed compute nodes (806) according to the method of FIG. 8 may be carried out using a graph that represents the global combining network (801). Such a graph may represent the compute nodes in the global combining network (801) and the links that connect the compute nodes using, for example, the Graph Description Language ('GDL') or the eXtensible Graph Markup and Modeling Language ('XGMML').

The method of FIG. 8 includes designating (812) one of a plurality of point-to-point class routing identifiers (810) for each link (808) such that no compute node in the operational group is connected to two adjacent compute nodes in the operational group with links (808) designated for the same class routing identifiers (810). Designating (812) one of a plurality of point-to-point class routing identifiers (810) for each link (808) according to the method of FIG. 8 may be carried out by a service node of the parallel computer. Designating (812) one of a plurality of point-to-point class routing identifiers (810) for each link (808) according to the method of FIG. 8 is carried out by identifying (814) a particular class routing identifier among the plurality of point-to-point class routing identifiers (810), determining (816) whether the particular class routing identifier has already been designated for another link for the compute node, and if the identified class routing identifier has not already been designated for another link for the compute node, designating (818) the identified class routing identifier for the link. If the identified class routing identifier has already been designated for another link for the compute node, designating (812) one of a plurality of point-to-point class routing identifiers (810) for each link (808) according to the method of FIG. 8 is carried out by identifying another class routing identifier.

The method of FIG. 8 includes configuring (820) each compute node (806) of the operational group for point-to-point communications with each adjacent compute node in the global combining network (801) through the link between that compute node (806) and that adjacent compute node using that link's designated class routing identifier. Configuring (820) each compute node (806) of the operational group for point-to-point communications with each adjacent compute node in the global combining network (801) according to the method of FIG. 8 may be carried out by configuring (820) routing registers (826) for that compute node (806) with routing instructions (832) that associate each class routing identifier (828) with the corresponding link between that compute node and each adjacent compute node as discussed above with reference to FIGS. 7A and 7B.

In the example of FIG. 8, each compute node (806) includes routing registers (826) for storing routing instructions. The routing registers (826) of FIG. 8 associate a class routing identifier (828) with a link identifier (830). The class routing identifier (828) of FIG. 8 specifies a set of point-to-point class routing instructions for use by a compute node in routing a particular network packet in a global combining network. The link identifier (830) of FIG. 8 specifies a particular link from a compute node to one of its adjacent compute nodes in the global combining network. Associating a class routing identifier (828) with a link identifier (830) using the routing registers (826) provides the router for each compute node (806) with routing instructions (832) that specify the link along which the compute node's router should forward packets for a particular class routing identifier.

After each compute node of the operational group is configured for point-to-point communications with each adjacent compute node in the global combining network, a compute node may perform a point-to-point communication with an adjacent compute node of the operational group in the global combining network. For further explanation, therefore, consider FIG. 9 that sets forth a flow chart illustrating a further exemplary method for providing nearest neighbor point-to-point communications among compute nodes of an operational group in a global combining network of a parallel computer according to the present invention.

Figure 9:
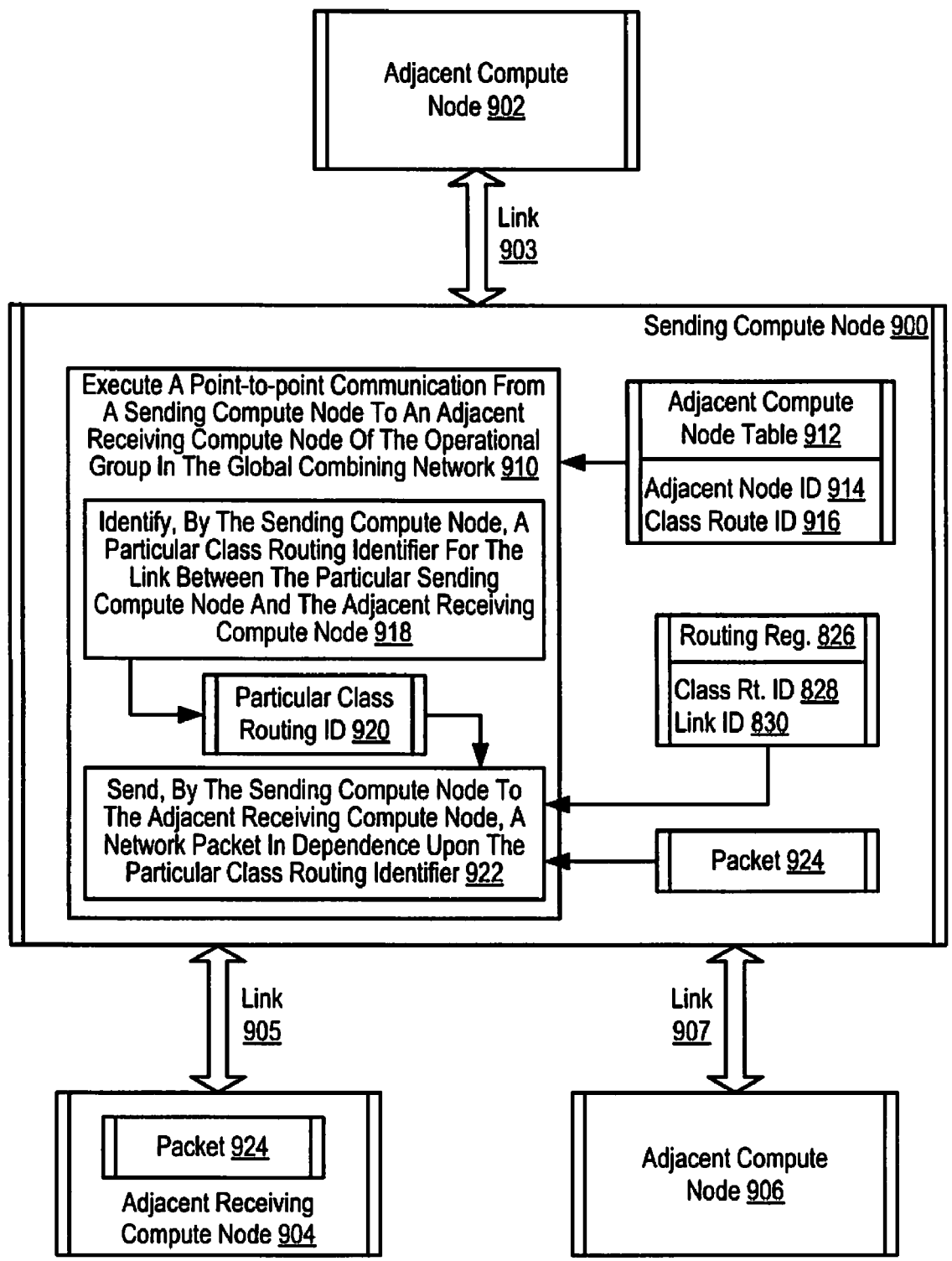
FIG. 9 sets forth a flow chart illustrating a further exemplary method for providing nearest neighbor point-to-point communications among compute nodes of an operational group in a global combining network of a parallel computer according to the present invention.

The example of FIG. 9 includes a sending compute node (900) connected to three adjacent compute nodes (902, 904, 906). In the example of FIG. 9, the sending compute node (900) is connected the adjacent compute node (902) through a bi-directional link (903). The sending compute node (900) is connected the adjacent compute node (904) through a bi-directional link (905). The sending compute node (900) is connected the adjacent compute node (906) through a bi-directional link (907).

The method of FIG. 9 includes executing (910) a point-to-point communication from the sending compute node (900) to an adjacent receiving compute node (904) of the operational group in the global combining network. Executing (910) a point-to-point communication from a sending compute node (900) to an adjacent receiving compute node (904) of the operational group in the global combining network according to the method of FIG. 9 includes identifying (918), by the sending compute node (900), a particular class routing identifier (920) for the link between the sending compute node (900) and the adjacent receiving compute node (904). The sending compute node (900) may identify (918) the particular class routing identifier (920) for the link between the sending compute node (900) and the adjacent receiving compute node (904) according to the method of FIG. 9 by retrieving, from an adjacent compute node table (912), the class routing identifier (916) associated with the identifier (914) for the adjacent receiving compute node (904). The adjacent compute node table (912) of FIG. 9 provides a lookup table for the compute node to identify the class routing identifier for any of its adjacent compute nodes of the operational group in the global combining network.

Executing (910) a point-to-point communication from a sending compute node (900) to an adjacent receiving compute node (904) of the operational group in the global combining network according to the method of FIG. 9 also includes sending (922), by the sending compute node (900) to the adjacent receiving compute node (904), a network packet (924) in dependence upon the particular class routing identifier (920). The sending compute node (900) may send (922) the network packet (924) to the adjacent receiving compute node (904) in dependence upon the particular class routing identifier (920) according to the method of FIG. 9 by encoding the particular class routing identifier (920) in the packet (924) and transmitting the packet (924) along the link (905) associated with the particular class routing identifier (920) in the routing registers (826) to the adjacent compute node (904). The routing registers (826) of FIG. 9 designate a class routing identifier (828) for each link to an adjacent compute node by associating the class routing identifier (828) with an identifier (830) for the link.

Exemplary embodiments of the present invention are described largely in the context of a fully functional parallel computer system for providing nearest neighbor point-to-point communications among compute nodes of an operational group in a global combining network. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for providing nearest neighbor point-to-point communications among compute nodes of an operational group in a global combining network of a parallel computer, each compute node connected to each adjacent compute node in the global combining network through a link, the method comprising:

identifying each link in the global combining network for each compute node of the operational group;

designating one of a plurality of point-to-point class routing identifiers for each link such that no compute node in the operational group is connected to two adjacent compute nodes in the operational group with links designated for the same class routing identifiers, including:

identifying a particular class routing identifier among the plurality of point-to-point class routing identifiers;

determining whether the particular class routing identifier has already been designated for another link for the compute node; and when the identified class routing identifier has not already been designated for another link for the compute node, designating the identified class routing identifier for the link; and configuring each compute node of the operational group for point-to-point communications with each adjacent compute node in the global combining network through the link between that compute node and that adjacent compute node using that link's designated class routing identifier.

2. The method of claim 1 wherein identifying each link in the global combining network for each compute node of the operational group further comprises:

traversing the compute nodes of the operational group in the global combining network using a depth first search; and identifying the links between the traversed compute nodes.

3. The method of claim 1 wherein configuring each compute node of the operational group for point-to-point communications with each adjacent compute node in the global combining network further comprises configuring routing registers for that compute node with routing instructions that associate each class routing identifier with the corresponding link between that compute node and each adjacent compute node.

4. The method of claim 1 further comprising executing a point-to-point communication from a sending compute node to an adjacent receiving compute node of the operational group in the global combining network, including:

identifying, by the sending compute node, a particular class routing identifier for the link between the sending compute node and the adjacent receiving compute node; and sending, by the sending compute node to the adjacent receiving compute node, a network packet in dependence upon the particular class routing identifier.

5. The method of claim 1 wherein the compute nodes are connected for data communications through a plurality of data communications networks, including the global combining network optimized for collective operations, and at least one of the other data communications networks optimized for point to point data communications.

6. A parallel computer for providing nearest neighbor point-to-point communications among compute nodes of an operational group in a global combining network, each compute node connected to each adjacent compute node in the global combining network through a link, the compute nodes comprised in the parallel computer, the parallel computer comprising a service node, the service node comprising a computer processor and computer memory operatively coupled to the computer processor, the computer memory having disposed within it computer program instructions that when executed by the computer processor cause the computer to carry out the steps of:

identifying each link in the global combining network for each compute node of the operational group;

designating one of a plurality of point-to-point class routing identifiers for each link such that no compute node in the operational group is connected to two adjacent compute nodes in the operational group with links designated for the same class routing identifiers, including:

identifying a particular class routing identifier among the plurality of point-to-point class routing identifiers;

determining whether the particular class routing identifier has already been designated for another link for the compute node; and when the identified class routing identifier has not already been designated for another link for the compute node, designating the identified class routing identifier for the link; and configuring each compute node of the operational group for point-to-point communications with each adjacent compute node in the global combining network through the link between that compute node and that adjacent compute node using that link's designated class routing identifier.

7. The parallel computer of claim 6 wherein identifying each link in the global combining network for each compute node of the operational group further comprises:

traversing the compute nodes of the operational group in the global combining network using a depth first search; and identifying the links between the traversed compute nodes.

8. The parallel computer of claim 6 wherein configuring each compute node of the operational group for point-to-point communications with each adjacent compute node in the global combining network further comprises configuring routing registers for that compute node with routing instructions that associate each class routing identifier with the corresponding link between that compute node and each adjacent compute node.

9. The parallel computer of claim 6 wherein each compute node has disposed within it computer program instructions capable of executing a point-to-point communication from the compute node to an adjacent receiving compute node of the operational group in the global combining network, including:

identifying, by the sending compute node, a particular class routing identifier for the link between the sending compute node and the adjacent receiving compute node; and sending, by the sending compute node to the adjacent receiving compute node, a network packet in dependence upon the particular class routing identifier.

10. The parallel computer of claim 6 wherein the compute nodes are connected for data communications through a plurality of data communications networks, including the global combining network optimized for collective operations, and at least one of the other data communications networks optimized for point to point data communications.

11. A computer program product for providing nearest neighbor point-to-point communications among compute nodes of an operational group in a global combining network of a parallel computer, each compute node connected to each adjacent compute node in the global combining network through a link, the computer program product includes a computer readable recordable device, comprising computer program instructions that when executed cause a computer to carry out the steps of:

identifying each link in the global combining network for each compute node of the operational group;

designating one of a plurality of point-to-point class routing identifiers for each link such that no compute node in the operational group is connected to two adjacent compute nodes in the operational group with links designated for the same class routing identifiers, including:

identifying a particular class routing identifier among the plurality of point-to-point class routing identifiers;

determining whether the particular class routing identifier has already been designated for another link for the compute node; and when the identified class routing identifier has not already been designated for another link for the compute node, designating the identified class routing identifier for the link; and configuring each compute node of the operational group for point-to-point communications with each adjacent compute node in the global combining network through the link between that compute node and that adjacent compute node using that link's designated class routing identifier.

12. The computer program product of claim 11 wherein identifying each link in the global combining network for each compute node of the operational group further comprises:

traversing the compute nodes of the operational group in the global combining network using a depth first search; and identifying the links between the traversed compute nodes.

13. The computer program product of claim 11 wherein configuring each compute node of the operational group for point-to-point communications with each adjacent compute node in the global combining network further comprises configuring routing registers for that compute node with routing instructions that associate each class routing identifier with the corresponding link between that compute node and each adjacent compute node.

14. The computer program product of claim 11 further comprising executing a point-to-point communication from a sending compute node to an adjacent receiving compute node of the operational group in the global combining network, including:

identifying, by the sending compute node, a particular class routing identifier for the link between the sending compute node and the adjacent receiving compute node; and sending, by the sending compute node to the adjacent receiving compute node, a network packet in dependence upon the particular class routing identifier.

15. The computer program product of claim 11 wherein the compute nodes are connected for data communications through a plurality of data communications networks, including the global combining network optimized for collective operations, and at least one of the other data communications networks optimized for point to point data communications.

* * * * *